Inventor
Robert Burger
by Roberts, Cushman & Grover
Attys

United States Patent Office 3,357,565
Patented Dec. 12, 1967

3,357,565
CLINICAL DIALYZER HAVING A FLOW PATH DECREASING IN WIDTH
Robert Burger, 28 Cunningham Road, Wellesley Hills, Mass. 02181
Filed Dec. 23, 1965, Ser. No. 516,008
2 Claims. (Cl. 210—321)

ABSTRACT OF THE DISCLOSURE

An artificial kidney comprising a spiral coil of rigid metallic wire mesh whose turns are spaced but progressively approach the axis of the coil, and a flattened tube of previous membraneous material interposed between the adjacent spires of the coil, said wire mesh forming a flow channel which decreases in radial width from the inlet end to the outlet end.

---

This invention pertains to dialyzers—the device herein disclosed being of general applicablity but designed with special reference to its clinical use in the treatment of blood or other fluid temporarily withdrawn from a human body for purification or conditioning, and in particular apparatus of the type popularly known as an "artificial kidney." During the past fifty years, many efforts have been made to devise extracorporeal apparatus capable of performing, in some measure at least, the normal functioning of an animal kidney whereby the life of a patient, suffering from non-functioning or malfunctioning of the kidney, may be saved or at least prolonged. Early efforts in this direction resulted in crude and cumbersome apparatus usually difficult to handle and expensive, and uncertain as to the effects that it produced, and was very seldom utilized. In later years such apparatus has been so much improved that it is now in daily use in many hospitals. However, even the latest of such devices leaves much to be desired, for example they are, for the most part, of a size larger than is desirable for bedside use. On the other hand, in the effort to reduce external dimensions, their capacity for blood purification has correspondingly been reduced, while some of them are complicated and difficult to service, in particular to clean or replace the porous membrane which is the essential element of such apparatus, and do not always provide for maintaining a uniform fluid pressure over the entire area of the membrane, thus resulting in inefficiency.

In comparison with such prior apparatus designed for this purpose, the present invention provides a kidney unit of compact dimensions and light weight such that it is readily movable from place to place and, if desired, installed at the bedside; it provides for simple and ready removal of a membrane which has become contaminated or otherwise deteriorated, and its replacement by a fresh membrane; it provides in a very simple way for maintaining a substantially uniform unit fluid pressure over the entire area of the membrane; it provides for high efficiency in respect to the passage of fluid through the membrane by supporting the membrane by means of a rigid foraminous wall through which fluid easily passes while at the same time preserving the initial area of the membrane, the latter being tubular; and it provides in a simple way a chamber of fixed dimensions but of ample size for housing the membrane thereby to insure a large area of contact of the fluid with the membrane without unduly increasing the external dimensions of the apparatus.

Briefly, and in general, there may be mentioned as advantages of this apparatus its capability of maintaining a predetermined constant flow rate with initial low pressure; a substantially uniform pressure throughout the entire area of the membrane, thus providing for efficient ultrafiltration; for the efficient use of the available membrane; of so high a normal efficiency as to be effective for its intended purpose even while dealing with a low volume of blood per unit of time, and wherein the membrane is readily replaceable when desired.

In the accompanying drawings wherein a desirable embodiment of the invention is illustrated by way of example—

Figure 1:
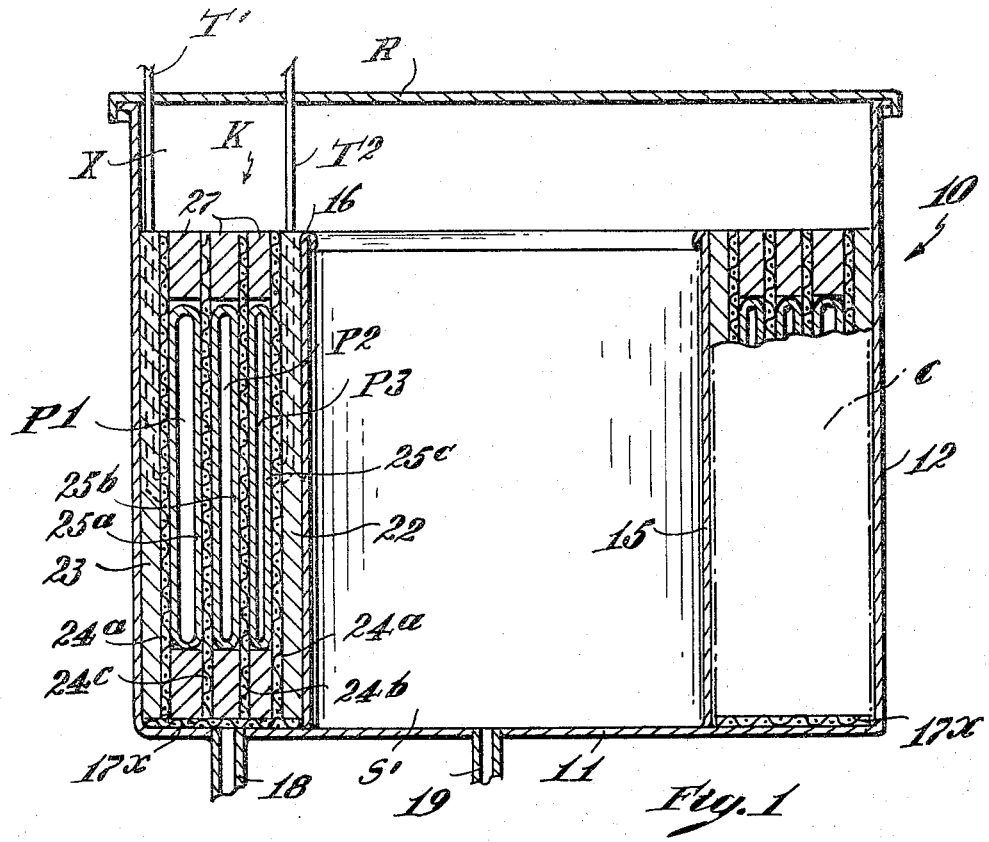
FIG. 1 is a diametrical vertical section, with a portion broken away, illustrating a dialyzer, according to the present invention, with the artificial kidney in operative position therein.
Figure 2:
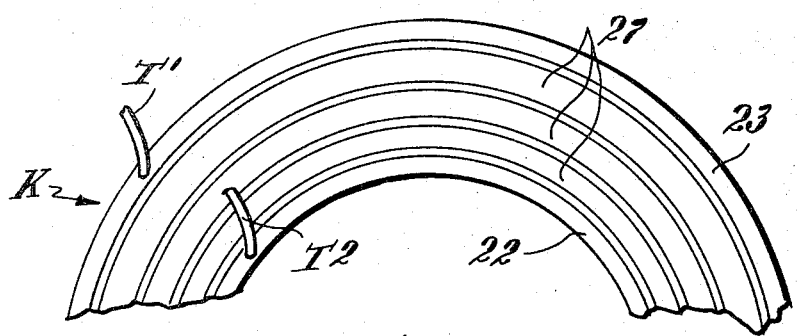
FIG. 2 is a fragmentary diagrammatic plan view of the kidney unit removed from the container.
Figure 3:
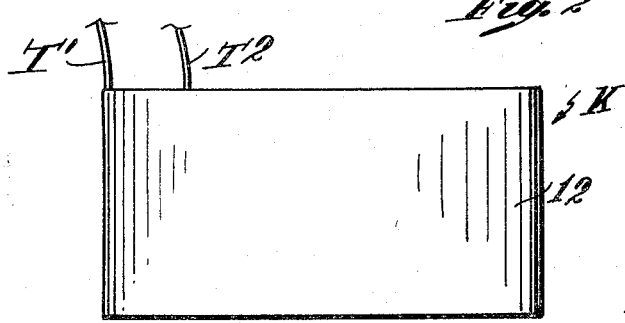
FIG. 3 is a side view, to smaller scale, of the kidney unit.

In the drawings, FIG. 1 shows the artificial kidney unit of the present invention as constituting an element of a dialyzer 10 comprising a casing of impervious material, for example stainless steel or a suitable hard plastic, and which has the horizontal bottom 11 and the cylindrical, peripheral outer wall 12—the latter terminating at a beaded upper edge 13 of a type customary in metallic containers. The casing also comprises a hollow cylindrical inner member 15, coaxial with the outer wall 12 and integral with the bottom 11, if desired, or united thereto leak-tight in any desired manner, the diameter of the inner cylindrical member 15 being such as to leave a space C between it and the outer wall 12, this space constituting an annular chamber for the reception of the artificial kidney. As shown, the cylindrical member or partition 15 is less in height than the outer wall 12 and terminates in a finished edge at 16 which is at a level substantially below that of the upper edge 13 of the outer casing. A suitable removable cover R may be provided for closing the receptacle.

The bottom wall 11 is provided with an opening giving access to the annular chamber C. A tube 18 (which may be flexible) is attached to the bottom wall 11 and provides for supplying fluid to the chamber C, for example water, which will be delivered under a predetermined and regulated pressure, as by the use of a suitable valve device (not shown), conventional in such apparatus. A ring 17x of foraminous material, for example stainless steel wire mesh, carpets the floor of the chamber C. The bottom 11 of the container is provided with another hole, located within the space S' defined by the cylindrical member 15, and a tube 19 connected to the container bottom 11, serves to conduct fluid to any desired point of discharge.

The artificial kidney unit K which occupies the annular chamber C comprises an inner hollow cylindrical core 22, desirably of a somewhat resilient foam plastic, for example styrofoam which is sufficiently hard to be shape-retaining. The kidney unit also has an outer cylindrical sheath 23 of the same type of material. The core 22 and the sheath 23 constitute the inner and outer walls respectively, of an annular receptacle in which the dialyzing coil is housed. The inner diameter of the core 22 and the outer diameter of the sheath 23 are such that when the kidney unit is installed in the annular chamber C, with its lower edge contacting the ring 17x, the core and sheath make substantially leak-tight contact, respectively, with the outer surface of the cylinder 15 and the inner surface of the wall 12.

Interposed between the members 22 and 23 there is a composite spiral coil comprising a length of foraminous material 24 such as a metal wire mesh, for example, of aluminum or stainless steel, and a tube 25 of a pervious membraneous material, for example cellophane or other pervious material, interposed between adjacent spires of the wire and extending uninterruptedly from an inlet point, where it is connected to a tube T¹ (FIG. 1) to an outlet point where it is connected to a tube T². These tubes may extend down through suitable slots or bores in the sheath 23 and the core 22 respectively, and are desirably connected to the membraneous tube 25 at points approximately midway the height of the composite spiral.

In FIG. 1, by way of example, but four spires 24a 24b, 24c and 24d of the foraminous spiral are shown, together with three turns 25a, 25b and 25c of the membraneous tube, but it will be understood that a greater or lesser number of coils may be provided. The turns of the tube, as indicated in this view, are flattened by compression between the adjacent turns of the foraminous spiral so that opposite walls of each turn of the tube are substantially rectilinear, vertical and closely adjacent to each other. Such flattening of the tube increases the ratio of its surface area to its blood capacity and provides a very short path of travel for fluid transversely of the tube. The spacing of the turns of the foraminous material determines the degree to which the tube is flattened and also the width of the canal provided by the tube through which the cleansing fluid flows. Preferably the spires of the foraminous material are so wound that the canal defined by the tube is more and more compressed from the inlet end toward the discharge end, as shown by comparison of passage at $P^1$, $P^2$ and $P^3$, respectively (FIG. 1), thus providing for a substantially uniform unit pressure throughout the length of the tube from its inlet end to its outlet end. This spacing of the several spires of the foraminous material is obtained by providing spacer elements 27 (FIG. 1) located between adjacent spires of the foraminous material, above and below the turns of the tube, and by making these spacers of progressively lesser thickness from the inlet end of the composite spiral toward its outlet end. The foraminous or screen material used in making the spiral container for the tube is substantially rigid so that it yields very little in response to the fluid pressure, while its rough surface, due to the weave structure, provides a good support for the membraneous tube, and at the same time provides, by capillary action, for substantially uniform distribution of the fluid throughout the entire depth of the artificial kidney.

In artificial kidneys as commonly constructed and wherein the membraneous tube is of substantial length, it has been necessary to supply the fluid at substantial pressure in order to obtain a sufficient pressure at a distance from the point of supply, since the pressure normally decreases progressively from the inlet toward the outlet. In accordance with the present arrangement, wherein the supporting spiral of foraminous material is so devised that the space between adjacent spires progressively decreases, the fluid pressure is substantially uniform throughout the length of the tube and thus it is not necessary to supply the cleansing fluid at so great an initial pressure as has heretofore been customary, thus making it possible to employ simpler, less-expensive and more readily controlled means for supplying the fluid to the apparatus. The uniform pressure throughout the length of the tube provides for more efficient ultrafiltration because of its more efficient use of the entire area of the membrane.

When the kidney unit is installed in the container, the foam which constitutes the core 22 and the outer sheath 23, makes substantially leak-tight contact with the walls of the annular chamber C in which the kidney unit is housed, and the cleansing fluid, entering through the tube 18 and passing upwardly through the foraminous ring 17x, rises through the spiral screen material, and wets the outer surface of the membraneous tube so that a wide area of contact is provided for the dialysis to take place, the cleansing fluid passing up through the screen material and eventually escaping into the space X above the kidney unit and thence overflowing over the edge 16 of the inner wall 15 of the container and into the central space S from which it is drained away through the tube 19. At the completion of each kidney treatment, it is necessary to remove the contaminated artificial kidney unit, clean the container and insert a new sterile kidney unit. In order to do so, it is merely necessary to remove the artificial kidney unit, as hereinabove descirbed, from the container and drop a replacement kidney unit into the annular chamber C. Thus a single and simple operation, replaces the membrane with a fresh one.

While one desirable embodiment of the invention has herein been disclosed by way of example, it is to be understood that the invention is broadly inclusive of any and all modifications which fall within the scope of the appended claims.

I claim:

1. A dialyzer including a container comprising, in combination, a circular bottom, an outer cylindrical wall and an inner cylindrical wall coaxial with the outer wall and of a diameter such as to provide an annular space between said walls; the walls being joined leak-tight to the bottom and the inner wall being lesser in height than the outer wall, a pervious carpet, for the annular space, resting upon the bottom wall and, in combination, a removable dialyzing unit comprising an outer cylindrical sheath of resilient material of an external diameter to fit leak-tight within the cylindrical outer wall of the container, and a hollow cylindrical core member also of resilient material and of an external diameter such as to fit leak-tight against the outer surface of the cylindrical inner wall, and a spiral of stiff pervious material with spacer means between the adjacent spires forming a flow channel, the radial width of which gradually decreases from the inlet end of said flow channel toward its outlet end, and a flattened membraneous tube forming a spiral whose spires are interposed between those of the stiff coil, said unit being of a height approximating that of the inner cylindrical casing, and means whereby dialyzing liquid, under pressure, may be introduced beneath the pervious carpet resting upon the bottom wall of said annular space.

2. A device according to claim 1, further characterized in that the bottom of the container has openings therethrough, one into the annular space between the outer and inner cylinders and the other into the space within the inner cylinder respectively, means for delivering dialyzing liquid under pressure to the first-named of said openings, and means for receiving liquid discharged from the second-named of said openings.

References Cited

UNITED STATES PATENTS

| 1,580,905 | 4/1926 | Kogstrom | 55—379 X |
| 2,352,300 | 6/1944 | Walker et al. | 210—487 X |
| 2,400,076 | 5/1946 | Dauster | 55—520 X |
| 2,650,709 | 9/1953 | Rosenak et al. | 210—321 |
| 2,880,501 | 4/1959 | Metz | 210—321 |
| 2,969,150 | 1/1961 | Broman | 210—321 |
| 3,077,268 | 2/1963 | Gobel et al. | 210—321 |
| 3,258,900 | 7/1966 | Harms | 55—502 X |

FOREIGN PATENTS

| 489,654 | 8/1938 | Great Britain. |
| 972,166 | 10/1964 | Great Britain. |

OTHER REFERENCES

J.A.M.A. 155 (10), pp. 26 and 27, July 3, 1954, American Medical Association, Chicago, Ill.

REUBEN, FRIEDMAN, *Primary Examiner.*

F. A. SPEAR, *Assistant Examiner.*